May 25, 1954    M. W. HELLAR, JR    2,679,629
FREQUENCY MEASURING CIRCUIT
Filed March 15, 1950
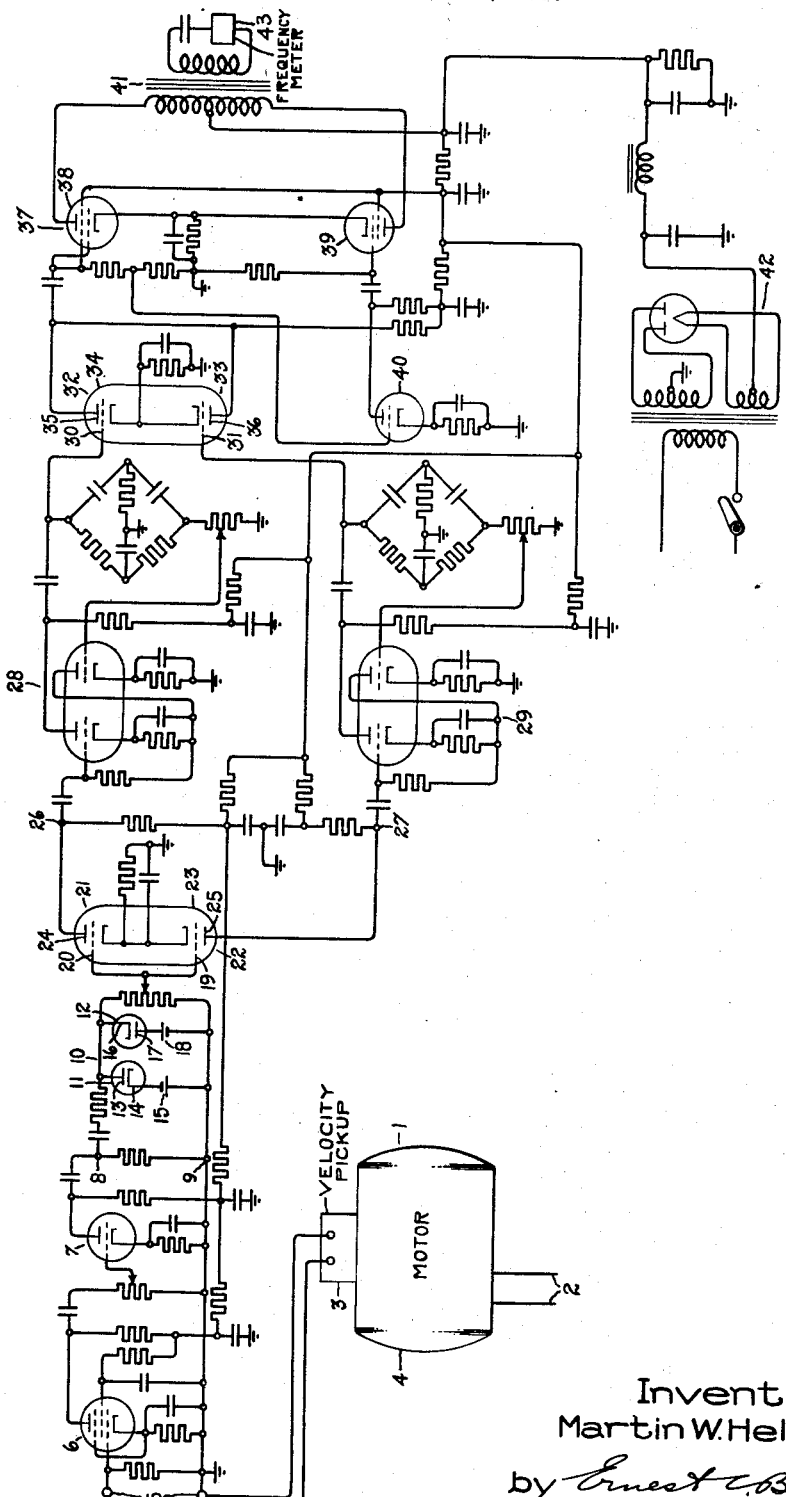
Inventor:
Martin W. Hellar, Jr.
by Ernest C. Britton
His Attorney.

Patented May 25, 1954

2,679,629

UNITED STATES PATENT OFFICE 2,679,629

FREQUENCY MEASURING CIRCUIT

Martin W. Hellar, Jr., Fort Wayne, Ind., assignor to General Electric Company, a corporation of New York Application March 15, 1950, Serial No. 149,733

9 Claims. (Cl. 324—78)

This invention relates to devices for measuring the speed of rotating equipment and more particularly to a device for accurately determining the speed of rotating apparatus without utilizing a mechanical connection to the shaft.

It is frequently desirable to accurately measure the speed of rotating apparatus in which the shaft is inaccessible, such as a hermetic motor used in refrigeration equipment. In order to measure the speed without utilizing a mechanical connection to the motor shaft, it is necessary to measure the frequency of the vibration of the equipment, which is directly proportional to the speed, thus giving a direct indication of the speed.

An object of this invention is to provide an improved device for measuring the speed of rotating apparatus.

Another object of this invention is to provide an improved device for accurately determining the speed of rotating apparatus without utilizing a mechanical connection to the shaft.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with one aspect of this invention, there is provided a velocity pick-up adapted to be placed on the frame of the rotating equipment for translating the mechanical vibration of the equipment into electrical current. The frequency of this current will be proportional to the frequency of the mechanical vibration and thus proportional to the rotational speed and the voltage produced by the pick-up will be proportional to the amplitude of the mechanical vibration. A voltage limiting device is excited by the output of the pick-up and serves to convert the variable frequency variable amplitude wave produced by the pick-up into a substantially square wave form having a constant amplitude. The voltage limiter feeds a pair of parallel arranged band pass filter elements which convert the constant amplitude square wave to a sine wave of constant amplitude, the mid-frequencies of the filter elements being staggered in order to produce a substantially flat frequency response over the desired range. Means are provided to additively combine the outputs of the two filter elements and a frequency meter is suitably coupled to the combining means. Thus, a constant amplitude sine wave is fed to the frequency meter which can be calibrated to provide a direct reading of speed.

In the drawing there is shown a schematic circuit diagram of one form of the improved speed measuring device of this invention.

Referring now to the drawing, there is shown a hermetically sealed motor 1 energized from any suitable external source of power (not shown) through lines 2. In a hermetic refrigerator motor, the principal component of vibration is actually due to the compressor piston movement since the compressor is sealed in the same enclosing casing with the motor. However, since the motor is directly coupled to the piston, this vibration is still a direct indication of motor speed. A pick-up 3, which may be of any suitable type such as a velocity pick-up, is placed against a shell 4 of the motor 1 and translates the mechanical vibration of the motor into an electrical vibration. The pick-up 3 is connected to input terminals 5 of a conventional pentode amplifier generally identified as 6 which in turn is resistance coupled in any conventional manner to a triode amplifier generally identified as 7. The pick-up 3 produces an alternating current wave of variable frequency which is proportional to the frequency of the mechanical vibration of the motor 1 and thus proportional to the rotational speed. The voltage produced by the pick-up 3 is proportional to the amplitude of the vibration of the motor 1 and may vary over a wide range. The maximum accuracy of a frequency meter is obtained by applying a sine wave voltage of constant amplitude and it is thus necessary to convert the variable amplitude signal produced by the pick-up to a constant amplitude sine wave having the same frequency as the output of the pick-up. In order to provide this conversion, the arrangement now to be described is provided.

The output terminals 8 and 9 of the triode amplifier 7 are suitably coupled to a voltage limiting device generally identified as 10. This device includes a pair of end to end biased diodes 11 and 12, the anode 13 of the diode 11 being connected to one side of the output circuit of the amplifier 7 and the cathode 14 being connected through a source of negative bias voltage 15 to the other side of the output circuit of the amplifier 7. The diode 12 is connected in reverse, i. e. the cathode 16 is connected to the same side as the anode 13 of the diode 11 and the anode 17 is connected through a negative bias voltage 18 to the same side as the cathode 14 of the diode 11. The voltage limiter or chopper 10 converts the variable amplitude output of the pick-up 3 into a substantially square wave form of constant amplitude.

The output of the voltage limiter 10 is fed in phase to the control grids 19 and 20 of vacuum tube amplifiers 21 and 22, shown here as being encased in a common envelope 23, the plates 24 and 25 of the amplifiers 21 and 22 being respectively connected to separate output circuits 26 and 27. A band pass filter circuit 28 is arranged in series with the output circuit 26 of amplifier 21 and a similar band pass filter circuit 29 is arranged in series with the output circuit 27 of the amplifier 22. The mid-frequencies of the filter circuits 28 and 29 may be suitably staggered in order to provide a substantially flat frequency response over the desired frequency range. The filter circuits shown are of the feed-back type as described in the magazine QST for September 1948. However, it will be readily understood that any other suitable type of filter circuit may be utilized. The parallel filter circuits 28 and 29 convert the square constant amplitude wave produced by the voltage limiter 10 to a sine wave of constant amplitude.

The constant amplitude sine wave signals produced by the two band pass filter circuits 28 and 29 are impressed on the grids 30 and 31 of two separate symmetrical amplifier sections 32 and 33, shown here as being encased in a common envelope 34. The plates 35 and 36 of the amplifiers 32 and 33 are provided with a common load in order to additively combine the separate signals from the two filter circuits 28 and 29. The adding amplifiers 32 and 33 are then suitably coupled to a conventional push-pull amplifier circuit 37 having one tube 38 directly driven by the output of the adding amplifier and the other tube 39 driven through a phase inverter 40. The output of the push-pull amplifier 37 is then suitably matched to the frequency meter 43 by a matching transformer 41. A conventional rectifier circuit generally identified as 42 provides the necessary power for the entire circuit. The filters 28 and 29 may be tuned to filter out the fundamental of the square wave or to a harmonic, such as the third, in order to secure an appropriate frequency range for the frequency meter 43.

The frequency meter 43 can be directly calibrated to indicate the speed of the motor 1 and thus this circuit provides a direct reading instrument requiring no zero adjustment. Furthermore, the amplitude of the vibration of the motor 1 does not in any way affect the reading of the speed due to the voltage limiting circuit 10. While this circuit has been described as being particularly applicable to a hermetic refrigerator motor wherein the vibration is appreciable due to the compressor piston motion, this invention is equally applicable to any rotating equipment. However, when used with equipment wherein the vibration is very small, additional pre-amplification may be necessary in order to insure satisfactory operation of the voltage limiting circuit. While a biased diode voltage limiting circuit has been shown, it will be readily understood that any other circuit producing a square wave form may be utilized and it will also be readily understood that a single ended amplifier or any other suitable amplifier may be used instead of the push-pull amplifier 37 shown.

Previous speed measurements on rotating equipment in which the shaft was not accessible were ordinarily made with a reed type vibrometer having an accuracy on the order of plus or minus 15 R. P. M. These instruments were difficult to maintain in calibration and were somewhat difficult to read. The only inaccuracy introduced into improved circuit of this invention is the frequency meter itself. With the filters tuned to the third harmonic and using a 75–90 cycles per second meter calibrated for a speed range of 1500 to 1800 R. P. M., it has been found that this circuit permits measurements of speed accurate to within 2 R. P. M. out of 1800 or 0.17%. Increased accuracy is possible by decreasing the speed range, for example, with a meter having a range of 84 to 90 cycles per second, a maximum accuracy of 1.2 R. P. M. or 0.07% may be produced over a speed range from 1680 to 1800 R. P. M. These accuracies are only possible because this circuit provides a constant amplitude voltage at the terminals of the frequency meter.

While two parallel filter circuits 28 and 29 are shown, the band width may be increased by adding more parallel filter circuits, or a single filter circuit may be used if the desired speed range to be covered is small. It will now be readily apparent that this invention provides a direct reading extremely accurate speed measurement device which does not require a mechanical connection with the shaft.

While I have illustrated and described a particular embodiment of this invention, modifications thereof will occur to those skilled in the art. I desire it to be understood therefore that this invention is not to be limited to the particular arrangement disclosed and I intend in the appended claims to cover all modifications which do not depart from the spirit and scope of my invention.

What I claim as new and desire to secure by Letters Patent of the United States is:

1. In a circuit for measuring the frequency of a single electrical wave having variable frequency and amplitude, a voltage limiting device for converting said single wave to a substantially square wave form having a constant amplitude, a plurality of band pass filter elements arranged in parallel and excited by said voltage limiting device for converting said constant amplitude square wave to a substantially sine wave of constant amplitude, the mid-frequencies of said filter elements being staggered to produce a substantially flat frequency response over a frequency band having a width comparable to the range of frequency variation of said wave, and single frequency measuring means connected to the outputs of said band pass filter elements.

2. In a circuit for measuring the frequency of a single electrical wave having variable frequency and amplitude, a voltage limiting device having its input circuit excited by said single wave for converting the same into a substantially square wave form having a constant amplitude, a pair of selective filter circuits arranged for common excitation from said voltage limiting device for converting said constant amplitude square wave to a substantially sine wave of constant amplitude, said filter circuits having a common additive output and single frequency measuring means connected to said common output of said filter circuits.

3. In a circuit for measuring the frequency of a single wave having variable frequency and amplitude, a voltage limiting device having its input circuit excited by said single wave for converting the same into a substantially square wave form having a constant amplitude; said device comprising a pair of rectifying elements, one of said elements having an anode connected to one side of the input of said device and a cathode connected through a negative bias voltage to the other side of said input, the other of said rectifying elements being connected in reverse with respect to said first element; a plurality of band pass filter elements arranged in parallel and excited by the output of said voltage limiting device for converting said constant amplitude square wave to a substantially sine wave of a constant amplitude, said filter elements having their mid-frequencies staggered to produce a substantially flat frequency response over a frequency band having a width comparable to the range of frequency variation of said wave, and single frequency measuring means connected to the outputs of said filter elements.

4. In a circuit for measuring the frequency of a single electrical wave having variable frequency and amplitude, a voltage limiting device for converting said single wave into a substantially square wave form having a constant amplitude, a plurality of feedback-type filter circuits arranged in parallel for converting said constant amplitude square wave to a substantially sine wave of constant amplitude, and single frequency measuring means connected to the outputs of said filter elements.

5. In a circuit for measuring the frequency of a single electrical wave having variable frequency and amplitude, a voltage limiting device having its input circuit excited by said single wave for converting the same into a substantially square wave form having a constant amplitude, means for amplifying the output of said voltage limiting device comprising a pair of vacuum tube amplifiers having a common input circuit excited by said voltage limiting device and separate output circuits, a band pass filter element in series with each output circuit of said amplifying means for converting said constant amplitude square wave to a substantially sine wave of constant amplitude, said filter elements being arranged in parallel with their mid-frequencies staggered to produce a substantially flat frequency response over a frequency band having a width comparable to the range of frequency variation of said wave, means for additively combining the output of said filter elements, and single frequency measuring means connected to the output of said combining means.

6. In a circuit for measuring the frequency of a single electrical wave having variable frequency and amplitude, a voltage limiting device having its input circuit excited by said single wave for converting the same into a substantially square wave form having a constant amplitude, a plurality of band pass filter units arranged in parallel and excited by said voltage limiting device for converting said constant amplitude square wave to a substantially sine wave of constant amplitude, said filter units having their mid-frequencies staggered to produce a substantially flat frequency response over a frequency band having a width comparable to the range of frequency variation of said wave, means for additively combining the output of said filter units, and single frequency measuring means connected to the output of said combining means.

7. In a circuit for measuring the frequency of a single electrical wave having a variable frequency in amplitude, a voltage limiting device having its input circuit excited by said single wave for converting the same into a substantially square wave form having a constant amplitude, a plurality of band pass filter elements arranged in parallel and excited by said voltage limiting device for converting said constant amplitude square wave to a substantially sine wave of constant amplitude, said filter elements having their mid-frequencies staggered to produce a substantially flat frequency response over a frequency band having a width comparable to the range of frequency variation of said wave, means for amplifying the output of said filter elements including a pair of vacuum tube amplifiers having their input circuits respectively excited by said filter elements and having a common additive output circuit, and single frequency measuring means connected to said output circuit of said amplifying means.

8. In a circuit for measuring the frequency of a single electrical wave having variable frequency and amplitude, means for amplifying said single wave including a vacuum tube amplifier having an input circuit excited by said single wave and an output circuit, a voltage limiting device coupled to said output circuit of said amplifying means for converting the output thereof into a substantially square wave form having constant amplitude; said voltage limiting device including a pair of rectifying elements, the anode of one element being connected to one side of the output of said amplifying means and the cathode of said one element being connected through a negative bias voltage to the other side of said output circuit, the other of said rectifying elements being connected in reverse with respect to said first element; means for amplifying the output of said voltage limiting device including a pair of vacuum tube amplifiers having a common input circuit excited by said voltage limiting device and separate output circuits, a band pass filter element arranged in series with each output circuit of said last-mentioned amplifying means for converting said constant amplitude square wave to a substantially sine wave of constant amplitude, said filter elements being arranged in parallel with their mid-frequencies staggered to produce a substantially flat frequency response over a frequency band having a width comparable to the range of frequency variation of said wave, means for amplifying the output of said filter elements including a plurality of vacuum tube amplifiers having their input circuits respectively excited by said filter elements and having a common additive output circuit, and single frequency measuring means connected to said output circuit of said amplifying means.

9. In a circuit for measuring the frequency of a single electrical wave having variable frequency and amplitude, a voltage limiting device for converting said single wave into a substantially square wave form having a constant amplitude, a pair of band pass filter elements tuned to the third harmonic of said wave and arranged for in-phase excitation from said voltage limiting device for converting said constant amplitude square wave to a substantially sine wave of a constant amplitude, said filter elements being arranged in parallel with their mid-frequencies staggered to produce a substantially flat frequency response over a frequency band having a width comparable to the range of frequency variation of said wave, means for additively combining the output of said filter elements, and single frequency measuring means connected to the output of said combining means.

References Cited in the file of this patent

UNITED STATES PATENTS

| Number | Name | Date |
|---|---|---|
| 1,991,060 | Osbon | Feb. 12, 1935 |
| 2,077,049 | MacDonald | Apr. 13, 1937 |
| 2,340,364 | Bedford | Feb. 1, 1944 |
| 2,370,483 | Muffly | Feb. 27, 1945 |
| 2,383,984 | Oberweiser | Sept. 4, 1945 |
| 2,423,866 | Woodyard | July 15, 1947 |
| 2,552,348 | Shapiro et al. | May 8, 1951 |

FOREIGN PATENTS

| Number | Country | Date |
|---|---|---|
| 564,752 | Great Britain | Oct. 11, 1944 |

OTHER REFERENCES

"Electronics," June 1944, pp. 100–194, 310, 312.